(12) United States Patent
Tupper

(10) Patent No.: US 7,189,381 B2
(45) Date of Patent: Mar. 13, 2007

(54) METHOD OF SCRUBBING LOWER MASS SULFIDES WITH A SULFIDE SCRUBBING MEDIUM CAPABLE OF REGENERATION

(76) Inventor: Lorne Alvin Tupper, 4339-115 Street, Edmonton, Alberta (CA) T6J 1P5

( * ) Notice: Subject to any disclaimer, the term of this patent is extended or adjusted under 35 U.S.C. 154(b) by 0 days.

(21) Appl. No.: 10/884,260

(22) Filed: Jul. 2, 2004

(65) Prior Publication Data
US 2005/0002840 A1 Jan. 6, 2005

(30) Foreign Application Priority Data
Jul. 3, 2003 (CA) .................... 2434233

(51) Int. Cl.
*B01D 53/50* (2006.01)
(52) U.S. Cl. .................. 423/243.03; 422/170
(58) Field of Classification Search .......... 423/220, 423/224, 230, 231, 573.1, 576.8, 574.1, 575; 422/169, 170, 171, 189, 190
See application file for complete search history.

(56) References Cited

U.S. PATENT DOCUMENTS

| | | | | |
|---|---|---|---|---|
| 2,630,374 | A | * | 3/1953 | Miller ................... 423/574.1 |
| 3,154,383 | A | * | 10/1964 | Froning et al. ......... 423/573.1 |
| 3,637,352 | A | * | 1/1972 | Bratzler et al. ........... 423/222 |
| 4,366,131 | A | * | 12/1982 | Fox ........................ 423/231 |
| 4,438,069 | A | * | 3/1984 | Peterman et al. ........... 422/62 |
| 4,478,800 | A | | 10/1984 | van der Wal |
| 4,552,750 | A | | 11/1985 | van der Wal |
| 4,629,612 | A | | 12/1986 | van der Wal |

(Continued)

FOREIGN PATENT DOCUMENTS

| GB | 267138 | * | 12/1927 |
|---|---|---|---|
| JP | 2003-144836 | * | 5/2003 |

OTHER PUBLICATIONS

Full English translation of JP 2003-144836, published May 2003.*

(Continued)

*Primary Examiner*—Colleen P. Cooke
*Assistant Examiner*—Paul Wartalowicz
(74) *Attorney, Agent, or Firm*—Davis Bujold & Daniels, P.L.L.C.

(57) ABSTRACT

A method of scrubbing lower mass sulfides with a sulfide scrubbing medium capable of regeneration. The sequential order of gas flow through three vessels is altered. A first of the three vessels is maintained in a scrubbing mode, scrubbing to breakthrough sulphur from the gas that passes through it. A second of the three vessels is maintained in a conditioning mode. Sulfide scrubbing medium in the vessel removes any residue of sulphur from the gas while being conditioned by such limited exposure to sulphur. A third of the three vessels is maintained in a regeneration mode. Saturated sulfide scrubbing medium in the vessel removes excess oxygen from the gas while being regenerated by such exposure to oxygen.

6 Claims, 2 Drawing Sheets

U.S. PATENT DOCUMENTS

| | | | |
|---|---|---|---|
| 4,857,285 A | * | 8/1989 | Gal .......................... 423/230 |
| 5,057,473 A | | 10/1991 | Voecks |
| 5,114,689 A | * | 5/1992 | Nagji et al. ................ 423/230 |
| 5,133,954 A | * | 7/1992 | Ranke et al. ............ 423/573.1 |
| 5,152,970 A | | 10/1992 | van der Wal |
| 5,271,907 A | | 12/1993 | Copeland |
| 5,401,475 A | * | 3/1995 | Ayala et al. ................ 422/190 |
| 5,674,463 A | | 10/1997 | Dao |
| 6,017,507 A | * | 1/2000 | Nougayrede et al. .... 423/573.1 |
| 6,099,819 A | | 8/2000 | Srinivas et al. |

OTHER PUBLICATIONS

"Direct Oxidation Technology & Process Unveiled for Large-Scale 1 to 50 Ton Per Day Sulfur Removal." Excerpt on Sulfa Treat taken from Hydrocarbon Processing Journal, as early as May 17, 2004.

SulfaTreat XLP, Product Bulletin, as early as Dec. 31, 2002.

* cited by examiner

METHOD OF SCRUBBING LOWER MASS SULFIDES WITH A SULFIDE SCRUBBING MEDIUM CAPABLE OF REGENERATION

This application claims priority from Canadian Patent Application No. 2,434,233 filed Jul. 3, 2003.

FIELD OF THE INVENTION

The present invention relates to a method of scrubbing lower mass sulfides with a sulfide scrubbing medium capable of regeneration and, in particular, one that is capable of operating at relatively low temperatures (under 40 degrees celcius) oxidizing common lower mass sulfides into elementary sulphur and water.

BACKGROUND OF THE INVENTION

Iron Oxide based scrubbing mediums have been developed for use in the treatment of Hydrogen Sulphide gas (lower mass sulfides) since the 1800's. One example of a sulfide scrubbing medium which is in common use today, is sold under the Trade Mark "SULPHA TREAT".

U.S. Pat. No. 4,478,800 (van der Wal et al 1984) suggests that regeneration of the lower mass sulfides treating medium can be "carried out simultaneously by passing oxidizing agents together with the gases to be desulfurated over the absorption mass". A warning is given that "The amount of oxidizing agent must thus be chosen to be such that no sulfur dioxide is formed, since the latter would otherwise be present in the treated gas, a result which is not desirable".

SUMMARY OF THE INVENTION

What is required is an improved method of scrubbing lower mass sulfides with a sulfide scrubbing medium capable of regeneration to yield elemental sulphur and water.

According to the present invention there is provided a method of scrubbing lower mass sulfides with a sulfide scrubbing medium capable of regeneration. A first step involves providing at least three vessels containing sulfide scrubbing medium, and connective piping allowing gas to be directed sequentially through the at least three vessels in any selected sequential order. A second step involves flowing the gas together with an oxidizing agent sequentially through the at least three vessels. A third step involves changing the sequential order of the gas flow through the at least three vessels, as required, in order that:

a first of the at least three vessels is maintained in a scrubbing mode, scrubbing to breakthrough sulphur from the gas that passes through it;

a second of the at least three vessels is maintained in a conditioning mode, sulfide scrubbing medium in the vessel removing any residue of sulphur from the gas while being conditioned by such limited exposure to sulphur; and a third of the at least three vessels is maintained in a regeneration mode, saturated sulfide scrubbing medium in the vessel removing excess oxygen from the gas while being regenerated by such exposure to oxygen.

With the method, as described above, a first vessel is always in the scrubbing mode, scrubbing most of the sulphur from the gas. A second vessel is always in a conditioning mode, with the sulfide scrubbing medium being conditioned in preparation to being placed in the first position. A third vessel is always in a regeneration mode, with the saturated sulfide scrubbing medium being regenerated, while removing excess oxygen.

Although beneficial results may be obtained through the use of the method, as described above, even more beneficial results may be obtained by including a fourth vessel. The fourth vessel provides redundancy as a safety measure to ensure that all of the lethal lower mass sulfides is removed, it also allows vessel change out to occur while the remaining three vessels continue to operate.

Although beneficial results may be obtained through the use of the method, as described above, even more beneficial results may be obtained when a control processor is provided which is connected to sensors monitoring the output gas flow from each of the at least three vessels. The control processor switches the sequential order of flow through the at least three vessels in response to data received from the sensors. For example, when the percentage of lower mass sulfides in the output gas flow from the first vessel rises beyond a preset level indicating the sulfide scrubbing medium is becoming saturated, the control processor will switch the vessel which was formerly in the first sequential position to the third position and will bring the vessel which formerly was in the second position to be conditioned, into the first position.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred method of scrubbing lower mass sulfides with a sulfide scrubbing medium capable of regeneration will now be described with reference to FIGS. 1 through 3.

Figure 1:
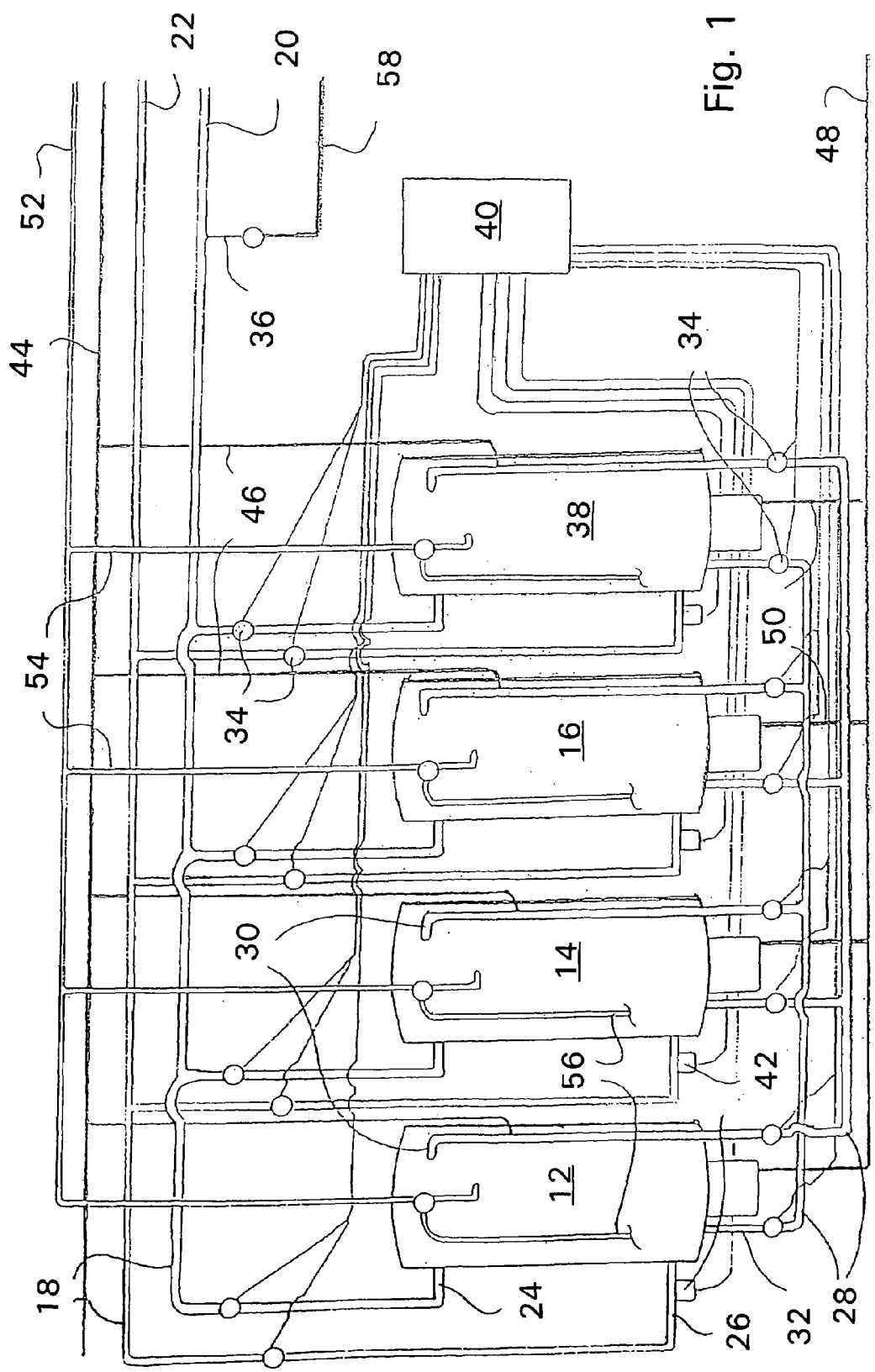
FIG. 1 is a schematic diagram of four vessels and associated piping connected in accordance with the teachings of the preferred method of scrubbing lower mass sulfides with a sulfide scrubbing medium capable of regeneration.

Referring to FIG. 1, a first step involves providing at least three vessels: first vessel 12, second vessel 14 and third vessel 16, each containing sulfide scrubbing medium and each connected by first piping 18 in a parallel orientation to a common gas inlet 20 and a common gas outlet 22 such that each of vessel 12, vessel 14 and vessel 16 have a first branch inlet 24 and a first branch outlet 26. Each of vessel 12, vessel 14 and vessel 16 is further connected by second piping 28 to each other such that each of vessel 12, vessel 14 and vessel 16 have a second branch inlet 30 and a second branch outlet 32 allowing the gas of one vessel to be routed to another. Switchable valves 34 are positioned at each of first branch inlet 24 and first branch outlet 26 of first piping 18 and second branch inlet 30 and second branch outlet 32 of second piping 28.

A second step involves flowing gas in through common gas inlet 20 and providing an oxidizing agent inlet 36 to oxidize the gas and then flowing the oxidized gas in any selected sequential order through a select one of first branch inlet 24 of first vessel 12, second vessel 14 or third vessel 16.

A third step involves changing the sequential order of the gas flow through the at least three vessels as required such that: a first of the at least three vessels is maintained in a scrubbing mode scrubbing to breakthrough sulphur from the gas that passes through it, a second of the at least three vessels is maintained in a conditioning mode (sulfide scrubbing medium in the vessel removing any residue of sulphur from the gas while being conditioned by such limited exposure to sulphur) and a third of the at least three vessels is maintained in a regeneration mode (saturated sulfide scrubbing medium in the vessel removing excess oxygen from the gas while being regenerated by such exposure to oxygen). Breakthrough has been found to occur when roughly 90% of the sulphur is being removed.

In the illustrated embodiment, a fourth step involves providing a fourth vessel 38, containing sulfide scrubbing medium, connected with first piping 18 to common gas inlet 20 and common gas outlet 22 and connected with second piping 28 to each of vessel 12, vessel 14 and vessel 16 in similar, parallel fashion as first vessel 12, second vessel 14 and third vessel 16 such that the gas of one vessel may be routed to another.

In the illustrated embodiment, a fifth step involves providing a control processor 40 connected to sensors 42 that monitor the output gas flow from each of first vessel 12, second vessel 14, third vessel 16 and fourth vessel 38 and switches, via switchable valves 34, the sequential order of flow through the vessels in response to the data received.

The remaining aspects of Method Of Scrubbing Lower mass sulfides With A Sulfide scrubbing medium capable of regeneration, not directly related to the inventive concept, will now be described with reference to FIG. 1. A common water line 44 is connected in parallel with branch water lines 46 to each second branch inlet 30. A common drain line 48 is connected in parallel with branch drain lines 50 to each of first vessel 12, second vessel 14, third vessel 16 and fourth vessel 38. A common flare line 52 is connected in parallel with branch flare lines 54 to each of first vessel 12, second vessel 14, third vessel 16 and fourth vessel 38. Outside vents 56 are connected to each of branch flare lines 54. An air line 58 is connected to oxidizing agent inlet 36.

EXAMPLE

First vessel 12 operates in a scrubbing mode, second vessel 14 operates in a conditioning mode and third vessel 16 operates in a regeneration mode. In this situation, fourth vessel 38 would be in a stand-by mode. In the event that first vessel 12 becomes inefficient and saturated, sensor 42 at first vessel 12 will send data to control processor 40 which, in turn, will switch, via switchable valves 34 in first piping 18, first vessel 12 from scrubbing mode to regeneration mode, second vessel 14 from conditioning mode to scrubbing mode and third vessel 16 from regeneration mode to conditioning mode. The necessary transfers of gas between each of first vessel 12, second vessel 14, third vessel 16 and fourth vessel 38 are accomplished by control processor 40 switching the necessary switchable valves 34 in second piping 28 such that the appropriate transfers of gas may be made between first vessel 12, second vessel 14, third vessel 16 and fourth vessel 38. If, for example, third vessel 16 was inoperable or taken off line for any reason, fourth vessel 38 would step in for third vessel 16 and operate in conditioning mode. It will be appreciated that an operator may also monitor and switch modes manually.

Figure 2:
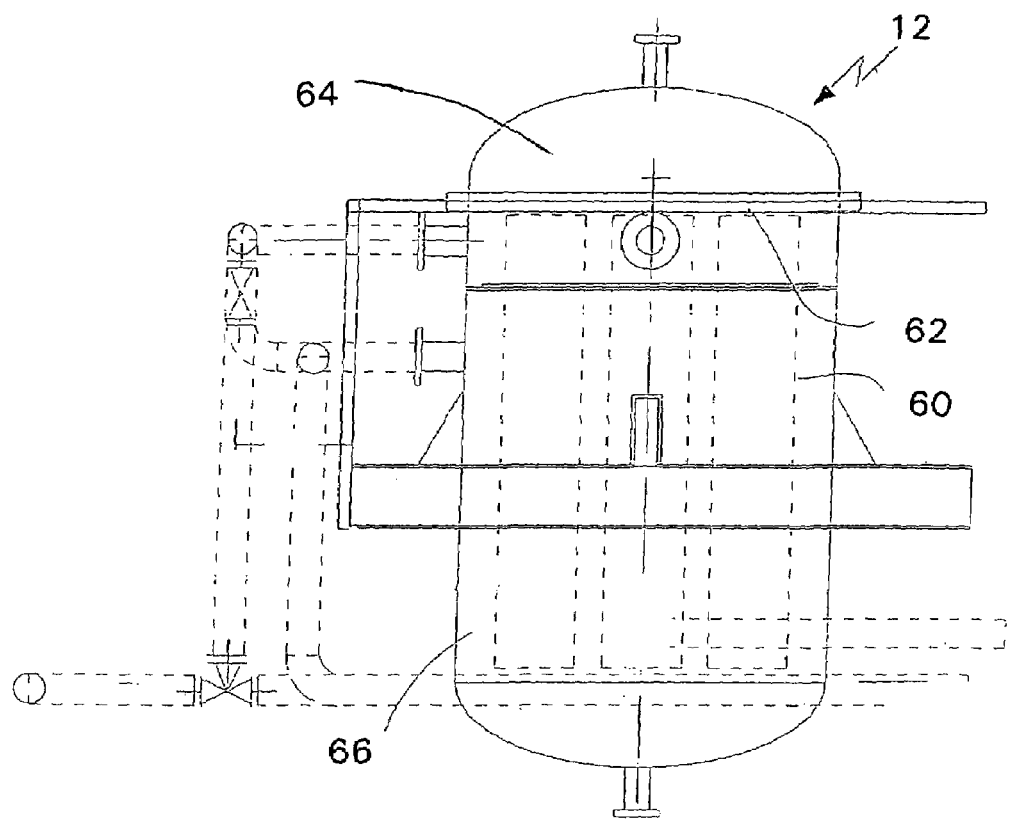
FIG. 2 is a side elevation view of one of the vessels illustrated in FIG. 1 (all vessels being the same).
Figure 3:
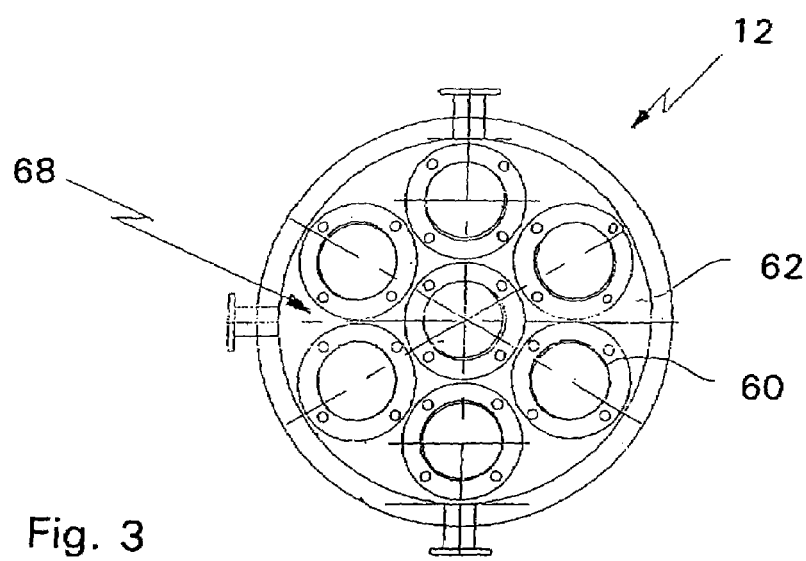
FIG. 3 is a top plan view of one of the vessels illustrated in FIG. 1 (all vessels being the same).

Referring to FIGS. 2 and 3, first vessel 12 will be used for illustration of all vessels. Vessel 12, is designed to hold the sulfide scrubbing medium in removable cartridges 60. Cartridges 60 are suspended from a tube sheet 62 which seals an upper portion 64 of vessel 12 from a lower portion 66. This design provides for downward flow through cartridge bundle 68. Downward flow increases the efficiency of the scrubbing medium, as the water produced flows by force of gravity and moistens the pellets ahead of the active scrubbing zone. The common lower mass sulfides, being soluable in water, react with the scrubbing medium in the aqueous phase. Both the absorption reaction and the regeneration reaction produce heat, with a greater amount of heat being produced by the regeneration reaction than the absorption reaction. In the illustrated embodiment, breaking up the medium bed into cartridges 60 and placing gas outlet 26 from the vessel just beneath tube sheet 62, takes advantage of circulation of the outlet gas around each cartridge to disperse the generated heat more effectively. In addition, cartridge presentation of the medium makes for easier and quicker replacement of medium beds with no direct exposure of servicing personnel.

Where a fuel gas containing sulfides is being treated, during a change out of cartridges the vessel in question is isolated by appropriate valves, with gas trapped within the vessel being sent to flare 52. The procedure is as follows:
turn off oxidizing agent inlet to vessel, thus allowing only flowing fuel gas to enter the vessel;
when the oxygen sensor on the outlet reads zero, close off the inlet valve and blow down the vessel to flare using a nitrogen purge;
when outlet sensor reads zero for sulfides, open vent line 56 and close flare line 52 and nitrogen purge;
open up vessel and replace cartridges;
close up vessel and repurge with nitrogen. When sensor on vent line reads zero oxygen, close off nitrogen purge and vent line 56;
open fuel gas inlet and flare line 52. When flare line sensor reads sulfides, open vessel outlet and close flare line 52;
reopen oxidizing agent inlet to vessel, thus completing the changeout.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of scrubbing lower mass sulfides with a sulfide scrubbing medium capable of regeneration, comprising the steps of:
   providing at least three vessels containing sulfide scrubbing medium, and connective piping allowing gas to be directed sequentially through the at least three vessels in any selected sequential order;
   flowing the gas together with an oxidizing agent in a combined gas stream sequentially through the at least three vessels;

changing the sequential order of the combined gas stream through the at least three vessels, as required, in order that:
- a first of the at least three vessels is maintained in a scrubbing mode, scrubbing to breakthrough sulphur from the gas that passes through it;
- a second of the at least three vessels is maintained in a conditioning mode, sulfide scrubbing medium in the vessel removing any residue of sulphur from the gas while being conditioned by such limited exposure to sulphur; and
- a third of the at least three vessels is maintained in a regeneration mode, saturated sulfide scrubbing medium in the vessel removing excess oxygen from the gas while being regenerated by such exposure to oxygen.

2. The method as defined in claim 1, further including a fourth vessel, the fourth vessel providing redundancy as a safety measure and allowing vessel change out to occur while the remaining three vessels continue to operate.

3. The method as defined in claim 1, further including a control processor and sensors monitoring the output gas flow from each of the at least three vessels, the control processor switching the sequential order of flow through the at least three vessels in response to data received from the sensors.

4. The method as defined in claim 1, the sulfide scrubbing medium being contained in at least one cartridge.

5. The method as defined in claim 4, there being more than one cartridge.

6. The method as defined in claim 5, the cartridges being suspended in parallel spaced relation within each of the vessels with outlet gas circulating between the cartridges.

* * * * *